United States Patent [19]
Turner et al.

[11] 3,896,857
[45] July 29, 1975

[54] CONTROL DEVICE HAVING A BLEED VALVE AND AN AUTOMATIC VALVE OPERATED SEQUENTIALLY BY A SINGLE BIMETAL ELEMENT

[75] Inventors: Jess H. Turner, Riverside; Elmer E. Wallace, Fullerton; Frank Fiedler, Jr., Rowland Heights, all of Calif.

[73] Assignee: Essex International, Inc., Fort Wayne, Ind.

[22] Filed: Feb. 20, 1974

[21] Appl. No.: 444,092

[52] U.S. Cl............. 137/628; 236/68 R; 236/80 R; 251/11; 251/30
[51] Int. Cl.².................. F16K 31/42; G05D 23/185
[58] Field of Search..... 251/11, 30; 236/68 R, 80 R, 236/80 B; 137/79, 614.19, 628

[56] References Cited
UNITED STATES PATENTS

| | | | |
|---|---|---|---|
| 2,490,420 | 12/1949 | Davis | 137/79 X |
| 3,578,243 | 5/1971 | Love | 236/80 B |
| 3,666,173 | 5/1972 | Ray | 236/68 R |
| 3,685,732 | 8/1972 | Haskins et al | 236/68 R |

Primary Examiner—Martin P. Schwadron
Assistant Examiner—Richard Gerard
Attorney, Agent, or Firm—Robert D. Sommer; Lawrence E. Freiburger

[57] ABSTRACT

A dual shut-off gas control device having a diaphragm operated valve and a control valve disposed in series in the main flow path to control the flow of fuel to a main burner. A single bimetal element acts to operate both a bleed valve and a control or automatic valve in a sequential manner when heated by a thermostatically controlled heater. The bleed valve includes an inlet bleed valve connected to the inlet, an outlet bleed valve connected to an outlet pressure chamber and an outlet connected to an operating pressure chamber. The main diaphragm responds to a pressure differential between the outlet pressure chamber and the operating pressure chamber. Outlet pressure regulation is provided by a diaphragm operated pressure regulator valve which has its inlet connected to the outlet of the bleed valve and its outlet connected to the outlet of the control device. Dual shut-off of the main flow path is provided by the main diaphragm operated valve and the automatic valve and dual shut-off of the bleed flow path is provided by the inlet bleed valve and the pressure regulator valve. A modification of the main diaphragm operated valve provides for a step opening.

6 Claims, 5 Drawing Figures

CONTROL DEVICE HAVING A BLEED VALVE AND AN AUTOMATIC VALVE OPERATED SEQUENTIALLY BY A SINGLE BIMETAL ELEMENT

BACKGROUND OF THE INVENTION

This invention pertains in general to gas valves and more particularly to diaphragm operated gas valves for gas burners.

When L P gas is being used to operate certain appliances such as space heaters, etc. it is necessary to shut off the gas as completely as possible when the appliance is turned off. This is because L P gas is heavier then air and will not dissipate as readily as other gases. Therefore even the smallest leak anywhere in the system can be dangerous and all steps should be taken to eliminate the possibility of such leaks.

Units installed on roof tops as well as elsewhere outside commonly employ ignition systems for gas other than standing pilots. Such units normally rely on an automatic valve to be a safety shut off valve as well as an on-off cyclical valve.

It is generally old in the gas valve art to include two valves of different types in series in the main flow path to insure that a complete shut-off of the gas flow is effected. It is also generally old to actuate a bleed valve with a thermostatically controlled bimetal member.

Oftentimes, gas control devices used on furnaces and the like have one valve operator for each valve. For example, such a gas control device might have a main diaphragm operated valve, an electromagnetically operated bleed valve and a bimetally operated automatic valve. Such duplication of valve operators tends to be costly, and it is therefore desirable to eliminate some of the valve operators, if possible.

SUMMARY OF THE INVENTION

In accordance with the present invention, two valves, an automatic valve and a bleed valve, are controlled by a single bimetal element which actuates the valves in a sequential manner. The common bimetal operator for the automatic valve and the bleed valve consists of a bimetal strip attached at one end to a pivotally mounted lever and carrying an automatic valve closure at the other end. The bleed valve has a stem positioned for operation by one end of the lever which is spring biased in a direction to push on the stem in such a manner to move the bleed valve to the on position. However, the engagement of the automatic valve closure with its valve seat causes the unheated bimetal strip to bias the lever in a direction opposite to that of the spring bias such that the bleed valve remains in the off position. When a heater on the bimetal strip is energized, the initial deflection of the bimetal strip permits the lever to operate the bleed valve but, at the same time, maintains the automatic valve closure closed.

Actuation of the bleed valve to its on position prevents further movement of the lever and the bimetal strip is then effective upon further heating to open the automatic valve.

Accordingly it is an object of the present invention to provide novel bimetal means for operating two valves in a sequential manner.

More specifically, it is an object of the present invention to provide novel bimetal means for operating a bleed valve and an automatic valve in a sequential manner.

Other objects and advantages of the present invention will become apparent from the following description taken in conjunction with the accompanying drawings.

DETAILED DESCRIPTION OF THE PREFERRED EMBODIMENT

Figure 1:
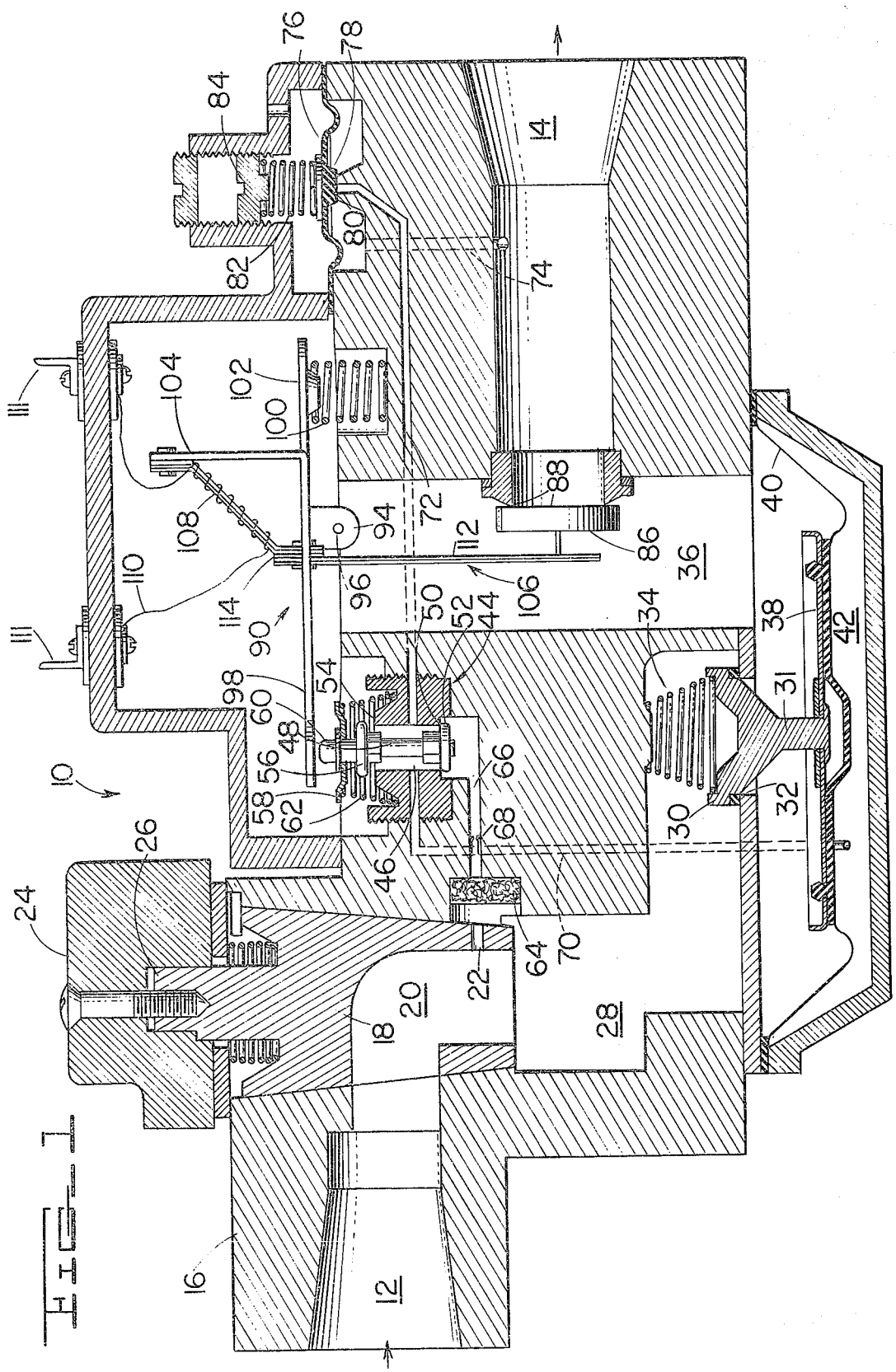
FIG. 1 is a partial diagrammatic, longitudinal section of a gas control device having a single bimetal operator to actuate the bleed valve and the automatic valve sequentially in accordance with the present invention.

Referring now to the drawing FIGURES and particularly FIG. 1, there is shown a control device constructed in accordance with the present invention. Such a control device generally indicated by reference numeral 10, has an input 12 adapted to be connected to a source of fuel and an output 14 to which a main gas burner (not shown) is connected. Disposed for rotatable movement within the control device housing 16 is plug valve 18 having an inlet bore 20 for registry with inlet 12 and bleed passage 22 for supplying bleed fuel to operate the main diaphragm (described later). A handle 24 is connected to an upwardly extending protrusion 26 on the plug valve 18 so that the plug valve 18 may be rotated from an "on" position as shown in FIG. 1 to an "off" position. When in the on position the plug valve 18 allows fuel to flow from the inlet 12 to an inlet chamber 28 in the main flow path and bleed fuel to flow through passageway 22. When in the "off" position, the plug valve 18 prevents fuel flow from the inlet 12 to either the main flow path or the bleed flow path. It should be understood that other types of on-off manually operated valves may be substituted for the plug valve 18 without departing from the present invention.

A valve member 30 cooperating with a valve seat 32 and biased to a normally closed position by compression spring 34 controls the flow of fuel from the inlet chamber 28 to an outlet chamber 36. The valve 30 is attached by means of a stem portion 31, in any convenient manner to a backup plate 38 which in turn is attached to a flexible diaphragm 40. Diaphragm 40 acts to separate outlet chamber 36 from an operating pressure chamber 42 in such a manner that the diaphragm 40 responds to pressure differentials between outlet chamber 36 and operating pressure chamber 42 to move valve member 30 between open and closed positions.

A two position bleed valve 44 controls the bleed flow within the control device. Bleed valve 44 includes a main bore 46 within which an operating stem 48 is adapted for reciprocal movement. At the end of main bore 46 an inlet bleed valve seat 50 is formed which cooperates with inlet bleed valve 52 attached to the end of operating stem 48. An outlet bleed valve seat 54 is formed at the other end of main bore 46 and cooperates with outlet bleed valve 56 attached to operating stem 48. A plate 58 having an aperture at the center is adapted for slidable movement on operating stem 48 between outlet bleed valve 56 and a cap 60 attached to the operating stem 48. As viewed in FIG. 1 the operating stem 48 of bleed valve 44 is biased to an upward position by compression spring 62 compressed between the plate 58 and the body of bleed valve 44. Thus, it can be seen that compression spring 62 acts to bias the operating stem 48 to such a position that inlet bleed valve 52 is normally closed and outlet bleed valve 56 is normally open.

Inlet bleed gas flows through passageway 22 in plug vaive 18, through bleed filter 64 to catch any particles which might be in the gas and into passageway 66, which is connected to main bore 46 and which is restricted by a restrictor 68. Bleed gas is supplied to the operating pressure chamber 42 by passageway 70 which communicates with the main bore 46 of the bleed valve 44. Also communicating with the main bore 46 of bleed valve 44 is a second passageway 72 which supplies bleed gas to the inlet of a servo pressure regulator. The outlet of the servo pressure regulator is connected by means of passageway 74 to the outlet 14 to regulate the outlet pressure whenever the main flow path is open. Pressure regulators are generally well known in the art and it should suffice to say that the regulator has a flexible diaphragm member 76 to which is attached a valve member 78 cooperating with valve seat 80. A compression spring member 82 normally urges the valve member 78 closed and is adjusted by threaded member 84.

Figure 2:
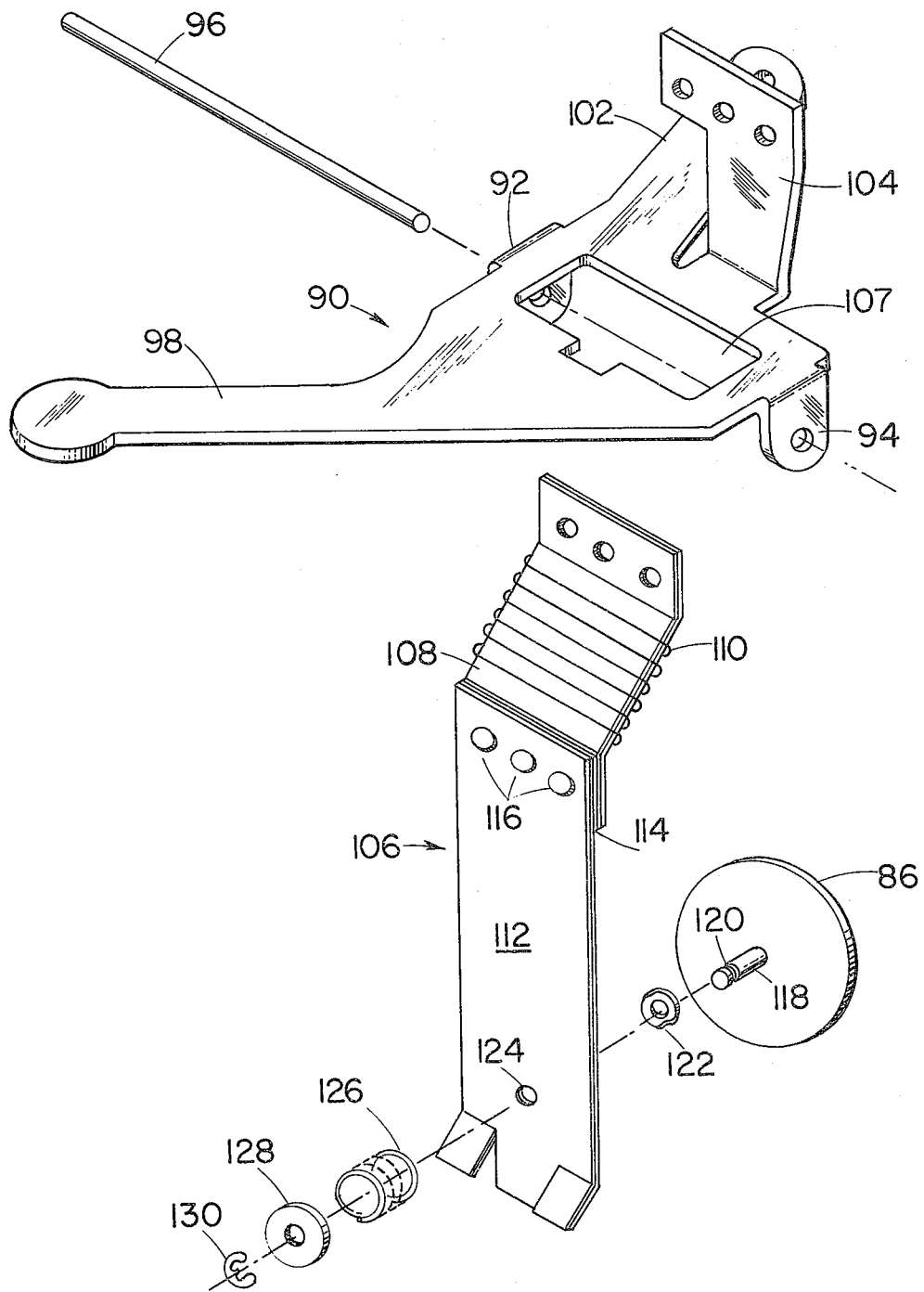
FIG. 2 is a partially exploded isometric view of the bleed and automatic valve operator in accordance with the present invention.

Referring now FIGS. 1 and 2 and particularly FIG. 2 there is shown a novel arrangement for actuating the bleed valve 44 and the automatic valve 86 which cooperates with valve seat 88 to close the main flow path. The novel arrangement includes a bleed valve actuator or lever generally indicated by reference numeral 90. Extending downwardly from the bleed valve actuator 90 are two opposing tabs 92 and 94, each having an aperture or hole adapted to receive a pin or shaft 96. The pin 96 is longer than the distance between the tabs 92 and 94 so that it extends beyond each tab when placed in the aperatures in the tabs. The extending portions of the pin 96 can then be used to mount the pin 96 in place. It can be seen that the pin thus forms an axle about which the bleed valve actuator 90 is pivoted.

A bleed valve actuating arm 98 extends from the central portion of the bleed valve actuator 90 and is adapted to be disposed adjacent the end of the bleed valve operating stem 48 so that the bleed valve actuator 90 is pivoted whenever the bleed valve actuator 90 is actuated in a counter clockwise direction as viewed about pin 96 in FIG. 1. A compression spring 100 exerts a force on a second arm 102 extending from the central portion of the bleed valve actuator 90 to bias the bleed valve actuator 90 in a counter clockwise direction as viewed in FIG. 1. Thus the bias on the bleed valve actuator 90 is such that bleed valve actuating arm 98 exerts a downward force on operating stem 48 to close outlet bleed valve 56 and open inlet bleed valve 52. Bleed valve actuator 90 further has an upwardly extending mounting tab 104 which is adapted to have an automatic valve operator, generally indicated by reference numeral 106, attached thereto. The automatic valve operator 106 is rigidly attached, such as by rivets, to mounting tab 104 and extends generally downward and through an opening 107 in the bleed valve actuator. Included in the automatic valve operator 106 is an actuating bimetal element 108 adapted to be rigidly attached to the mounting tab 104 in any convenient manner such as by riveting. A resistance heater wire 110 adapted to be connected in a thermostat or other control circuit by means of terminals 111 is wrapped around the actuating bimetal element 108 so that the bimetal element 108 is heated whenever electric power is applied to heater 110.

The bleed valve stem 48 is positioned for operation by bleed valve actuator 90 which is biased by spring 100 to push on stem 48 in such a manner as to move the bleed valve 44 to the on position. However, engagement of automatic valve 86 with valve seat 88 causes the unheated actuating bimetal element 108 to bias the bleed valve actuator 90 in a direction opposite to that of the bias of spring 100 such that the bleed valve 44 remains in the "off" position. When heater 110 is energized, the initial deflection of the actuating bimetal element 108 permits bleed valve actuator 90 to operate bleed valve 44, but at the same time, maintains automatic valve 86 closed. Actuation of bleed valve 44 to its on position prevents further movement of the bleed valve actuator 44 and the actuating bimetal 108 is then effective upon further heating to open automatic valve 86.

Compensating bimetal element 112 is connected to actuating bimetal element 108 in such a manner that the two bimetal elements are rigidly attached to one another but at the same time are thermally insulated from one another. Such a connection can be accomplished by disposing heat insulating material 114 between bimetal elements 108 and 112 and by passing rivets 116 through the assembly. Compensating bimetal element 112 is arranged so that it deflects in a direction opposite to that of actuating bimetal 108 to compensate for the effect of ambient temperature changes on actuating bimetal element 108. Automatic valve 86 is resiliently mounted at the end of compensating bimetal 112 to avoid the necessity of close tolerances in production. It can be seen that the automatic valve 86 may have a shaft 118 attached thereto, which has a groove 120 running around its periphery near the end. In assembly, the shaft is passed through spacing washer 122, aperture 124 in compensating bimetal 112, compression spring 126, a washer 128, and finally a horseshoe clip 130 is snapped into groove 120 to hold the assembly together.

The operation of the control device will be described in conjunction with FIGS. 1, 3, and 4 which show the bleed valve actuator 90 and automatic valve operator 106 in different operative positions. In the following description of the operation, it will be assumed that plug valve 18 will be in the on position and that terminals 111 are connected in a thermostat circuit.

The device is shown in FIG. 1 in the off position where the thermostat having contacts connected to terminals 111 is satisfied and therefore no current is supplied to heater 110. Therefore, actuating bimetal 108 is not heated and the automatic valve 86 is seated securely against valve seat 88. The resiliency of automatic valve actuator 106 actually provides a bias against mounting tab 104 which rotates bleed valve actuator 90 in a clockwise direction against the bias provided by spring 100. Thus, bleed valve 44 is in the off position with inlet bleed valve 52 closed and outlet bleed valve 56 open. It can be seen that the operating pressure chamber 42 is connected to, and at the same pressure as, outlet chamber 36 through passageway 70 and main bore 46 of bleed valve 44. Since operating pressure chamber 42 and outlet chamber 36 are at substantially the same pressure there is no pressure differential across diaphragm 40 and spring 34 will, therefore, maintain valve 30 closed. It can be seen that there will also be no pressure differential across the pressure regulator diaphragm 76 due to that fact that the one side of the diaphragm 76 is vented to atmosphere and the other side is at substantially atmospheric pressure through passageway 74 and outlet 14. Spring 82 will therefore bias pressure regulator valve 78 against valve seat 80. As a result, in the "off" position there is a dual or redundant shut-off of the main flow path as well as the bleed flow path (the dual shut-off in the main flow path being provided by diaphragm operated valve 30 and automatic valve 86 and the dual shut-off in the bleed flow path being provided by inlet bleed valve 52 and pressure regulator valve 78).

Figure 3:
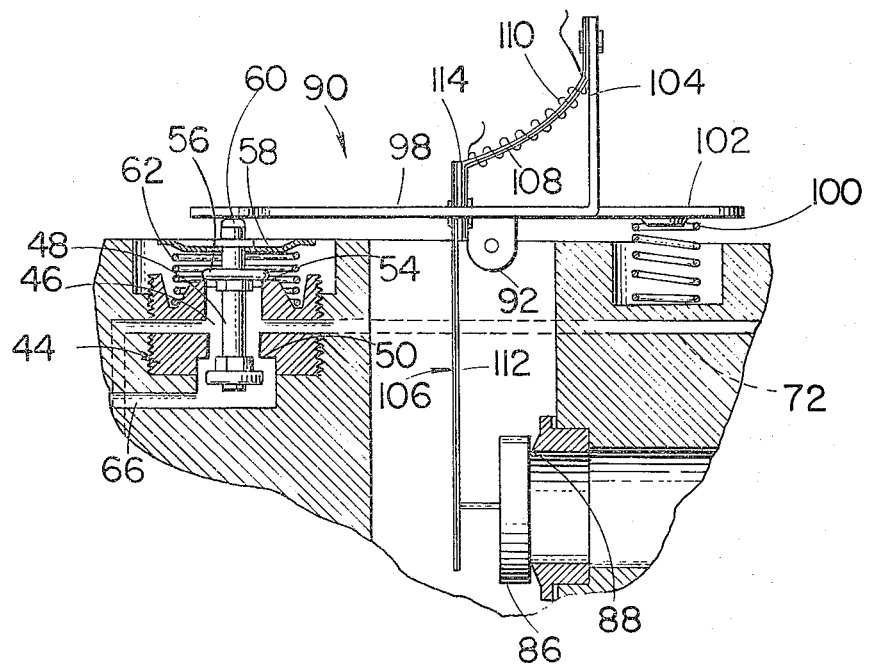
FIG. 3 is a fragmentary, cross sectional view showing a detail of the control device shown in FIG. 1 and showing the bleed and automatic valve operator in a partially actuated position.
Figure 4:
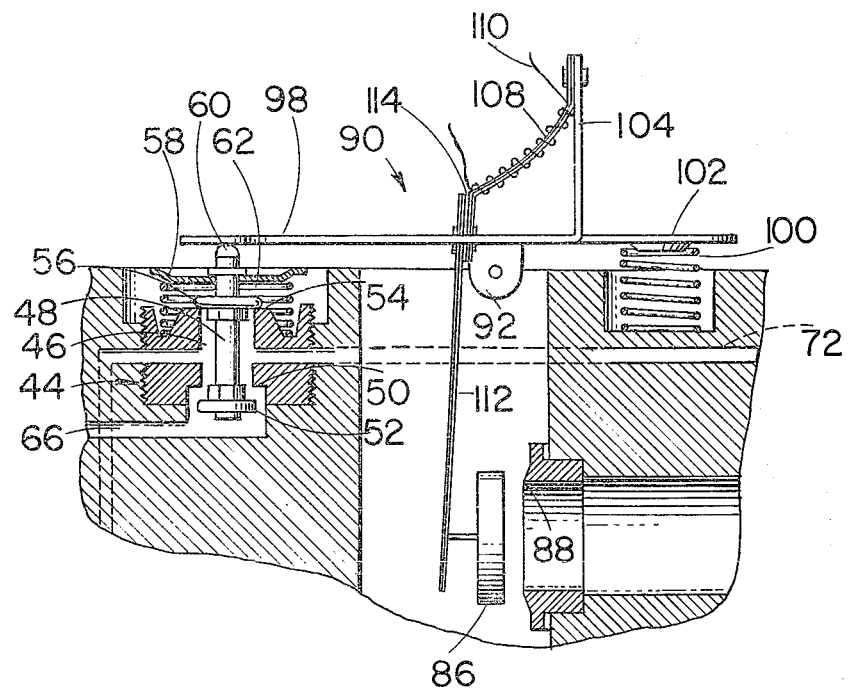
FIG. 4 is a fragmentary, cross sectional view showing a detail of the control device shown in FIG. 1 and showing the bleed and automatic valve operator in the fully actuated position.

Soon after the thermostat contacts have closed, the position of the bleed valve 44, the bleed valve actuator 90 and the automatic valve operator 106 will be similar to that shown in FIG. 3. Due to the closure of the thermostat contacts, current will be supplied to heater 110 which will heat the actuating bimetal element 108. Such heating of actuating bimetal 108 allows the bimetal to deflect slightly. The slight deflection of actuating bimetal 108 allows bleed valve actuator 90 to rotate in a counter clockwise direction. However, at the same time, the rotation of bleed valve actuator 90 acts to maintain the automatic valve 86 in a closed position. Actuation of bleed valve 44 closes outlet bleed valve 56 and opens inlet bleed valve 52. Thus, inlet bleed gas is supplied from restricted passageway 66, through open inlet bleed valve 52, through main bore 46, through passageway 70 to the operating pressure chamber 42. The flow of bleed gas to outlet chamber 42 will increase the pressure differential across diaphragm 40 where eventually the bias provided by spring 34 will be overcome and valve 30 opened. As long as automatic valve 86 remains closed there will be no pressure differential across pressure regulator diaphragm 76 and pressure regulator valve 78 will remain closed.

After the bleed valve actuator 90 has been allowed to rotate in the counter clockwise direction to its fullest extent, i.e., when outlet bleed valve 56 is closed and inlet bleed valve 52 is opened, continued heating of actuating bimetal element 108 will have no effect on bleed valve actuator 90. However, continued heating will deflect the actuating bimetal element 108 further. After the bleed valve 44 has been actuated, the pressure in operating pressure chamber 42 will increase to the point where valve 30 will move to an open position, allowing gas to flow into outlet chamber 36. The increased pressure in outlet chamber 36 acts to seat automatic valve 86 tightly against valve seat 88. Eventually, upon further collapse or deflection of actuating bimetal element 108, automatic valve operator 106 overcomes the force of pressure on valve 86 to open valve 86 with a snap action.

The pressure in outlet 14 will increase as soon as automatic valve 86 has opened. Pressure regulator diaphragm 76 responds to this increased pressure by moving upwardly and opening pressure regulator valve 78. Pressure regulator valve 78 will then respond to changes in the pressure in outlet 12 in a conventional manner to provide a substantially constant pressure at outlet 14 until the main flow path is closed.

When the thermostat is satisfied and the thermostat contacts open, the heater 110 will be de-energized. After that point, the operation of the device is the reverse of the operation upon thermostat closure. That is, the automatic valve 86 will close first. Closing of automatic valve 86, lowers the pressure at outlet 14 resulting in the closure of pressure regulator valve 78. Upon cooling, actuating bimetal element 108 will regain its shape. Eventually the bias provided by bimetal element 108 will overcome that provided by spring 100 to rotate the bleed valve actuator 90 in a clockwise direction, deactuating bleed valve 44. The main diaphragm operated valve 30 will, of course, close when the pressure in outlet chamber 36 is substantially equal to that in the operating pressure chamber 42.

Figure 5:
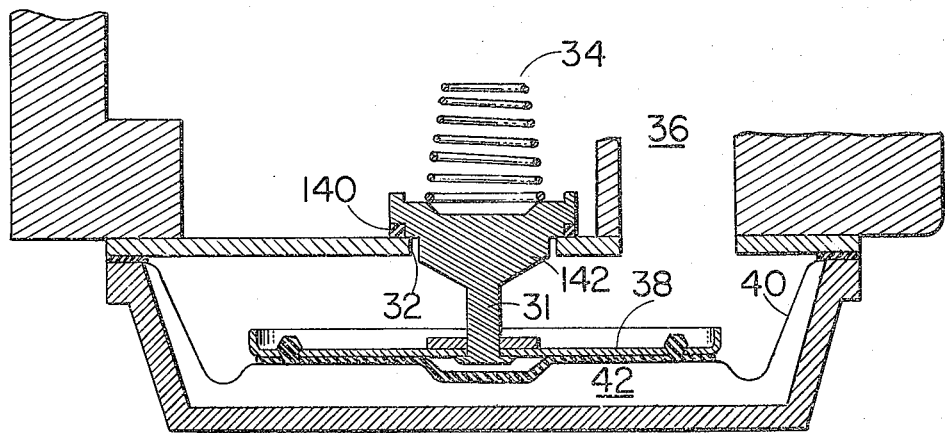
FIG. 5 is a fragmentary, cross sectional view showing a modification of the main diaphragm valve means which provides for step opening of the main diaphragm valve.

In FIG. 5 there is shown a modification of the main diaphragm valve means which provides for step opening of the main diaphragm valve. The step opening initially supplies a small amount of fuel to the main burner for ignition purposes and then increases the supply to full flow after ignition. Referring now to FIG. 5, when the pressure in the outlet chamber 36 is substantially equal to the pressure in operating chamber 42 valve 140 will securely contact valve seat 32 to close off the flow of gas. However, as soon as the pressure in operating chamber 42 is increased, the diaphragm 40 will move the valve member 30 upward against the bias of spring 34. The modification provides an enlarged portion 142 between valve stem 31 and valve member 140 of slightly smaller cross sectional area than valve seat 32 which acts to restrict the flow of gas through valve seat 32 as soon as valve 140 is opened. Eventually, as the pressure in operating pressure chamber 42 increases, and the diaphragm 40 is moved upward, valve stem 31 will be adjacent valve seat 32 allowing full flow of fuel through the valve seat 32.

As shown on FIG. 1, it should be noted that there is no provision for a pilot flow and corresponding safety valve means. The control device depicted schematically in FIG. 1 is useful in conjunction with ignition means other than pilot burners such as glow coil ignitors or spark ignitors. The control device depicted schematically in FIG. 1 can easily be modified by those of ordinary skill in the art to provide for a pilot burner flow and safety valve means.

Although the present invention has been described in conjunction with a specific embodiment, modifications and alterations can easily be made by those skilled in the art without departing from the true spirit of the invention, which is defined in the following claims.

We claim:

1. A control device for controlling the flow of fuel to a burner apparatus, comprising:
   a casing having inlet and outlet means;
   a differential pressure operated diaphragm mounted in said casing and defining an operating pressure chamber between a portion of said casing and said diaphragm;

main valve means operatively connected to said diaphragm for controlling the flow of fuel between said inlet and said outlet means;

a bleed flow path communicating with said inlet and said outlet means and said operating pressure chamber;

a bleed valve means situated in said bleed flowpath for causing operation of said main valve means when actuated;

a bleed valve actuating member pivotally mounted in said casing, said bleed valve actuating member having a portion adapted to actuate said bleed valve means;

first biasing means for normally urging said bleed valve actuating member to a bleed valve actuating position;

an automatic valve means for controlling fuel flow from said main valve means to said outlet means; and thermally responsive means connected to said bleed valve actuating member and said automatic valve means for operating said bleed valve means and said automatic valve means sequentially.

2. The control device as claimed in claim 1, wherein said differential pressure operated diaphragm responds to pressure differentials between said operating pressure chamber and an outlet chamber located downstream from said main valve means.

3. The control device as claimed in claim 2, wherein said bleed valve means connects said operating pressure chamber with said inlet means when actuated and with said outlet chamber when deactuated.

4. The control device as claimed in claim 3, wherein said thermally responsive means comprises:

a bimetal element connected to said bleed valve actuating member and having said automatic valve operably attached thereto;

said bimetal element being positioned when cold to close said automatic valve and to provide a second biasing means for urging said bleed valve actuating member to a bleed valve deactuating position; and said bimetal element being positioned when heated to allow said bleed valve actuating member to pivot to said bleed valve actuating position and to open said automatic valve sequentially.

5. the control device as claimed in claim 1, wherein said thermally responsive means comprises:

a bimetal element connected to said bleed valve actuating member and having said automatic valve operably attached thereto;

said bimetal element being positioned when cold to close said automatic valve and to provide a second biasing means for urging said bleed valve actuating member to a bleed valve deactuating position;

said bimetal element being positioned when heated to allow said bleed valve actuating member to pivot to said bleed valve actuating position and to open said automatic valve sequentially.

6. In a gas burner control device having a housing, inlet and outlet means in the housing, a diaphragm operated main valve situated to control the flow of fuel from said inlet to said outlet, a bleed valve for controlling the diaphragm operated main valve, and an automatic valve serially connected with the main valve, means for operating the bleed valve and the automatic valve sequentially comprising:

a bleed valve actuating member pivotally mounted in said housing, said bleed valve actuating member having a central portion about which said bleed valve actuating member is pivoted, an actuating arm extending from said central portion adapted to operate said bleed valve when pivoted to a bleed valve actuating position and a mounting portion extending from said central portion substantially perpendicular to the plane defined by said actuating arm;

first biasing means for urging said bleed valve actuating member to said bleed valve actuating position whereby said actuating arm actuates said bleed valve;

an actuating bimetal element connected to said mounting portion;

a compensating bimetal element thermally insulated from said actuating bimetal element, said compensating bimetal element being rigidly attached to said actuating bimetal element at one end and having said automatic valve mounted at the other end;

a valve seat in said housing adapted for cooperation with said automatic valve;

said automatic valve being in normally closed relationship with said valve seat when said actuating bimetal element is cold;

said actuating bimetal element and said compensating bimetal element providing a second biasing means on said bleed valve actuating member, said second biasing means overcoming said first biasing means only when said actuating bimetal element and said compensating bimetal element are cold, whereby said bleed valve actuating member is in a bleed valve deactuating position when said actuating bimetal element and said compensating bimetal element are cold; and means for heating said actuating bimetal element.

* * * * *